(12) United States Patent
Park et al.

(10) Patent No.: US 10,596,935 B2
(45) Date of Patent: Mar. 24, 2020

(54) VEHICLE SEAT

(71) Applicant: BENTLEY MOTORS LIMITED, Cheshire (GB)

(72) Inventors: Christopher Park, Cheshire (GB); Richard Watts, Cheshire (GB)

(73) Assignee: BENTLEY MOTORS LIMITED, Cheshire (GB)

( * ) Notice: Subject to any disclaimer, the term of this patent is extended or adjusted under 35 U.S.C. 154(b) by 177 days.

(21) Appl. No.: 15/780,548

(22) PCT Filed: Nov. 23, 2016

(86) PCT No.: PCT/GB2016/053639
§ 371 (c)(1),
(2) Date: May 31, 2018

(87) PCT Pub. No.: WO2017/093712
PCT Pub. Date: Jun. 8, 2017

(65) Prior Publication Data
US 2018/0345828 A1    Dec. 6, 2018

(30) Foreign Application Priority Data

Dec. 1, 2015 (GB) .................................... 1521198.0

(51) Int. Cl.
B60N 2/30 (2006.01)
B60N 2/02 (2006.01)

(52) U.S. Cl.
CPC ........... B60N 2/305 (2013.01); B60N 2/0228 (2013.01); B60N 2/3038 (2013.01); B60N 2/3047 (2013.01)

(58) Field of Classification Search
CPC .. B60N 2/0228; B60N 2/3038; B60N 2/3047; B60N 2/305

USPC ...................................... 296/65.01, 65.05, 67
See application file for complete search history.

(56) References Cited

U.S. PATENT DOCUMENTS

| | | | |
|---|---|---|---|
| 9,713,970 B1* | 7/2017 | Scheurer, II | B60N 2/20 |
| 2011/0215604 A1 | 9/2011 | Ko | |
| 2015/0175040 A1* | 6/2015 | Meszaros | B60N 2/3047 |
| | | | 297/188.01 |
| 2015/0175041 A1 | 6/2015 | Kuzma et al. | |
| 2015/0291066 A1* | 10/2015 | Han | B60N 2/3031 |
| | | | 297/61 |

FOREIGN PATENT DOCUMENTS

DE     102013225446 A1    6/2014

OTHER PUBLICATIONS

International Search Report and Written opinion received in International Application No. PCT/GB2016/053639, dated Mar. 13, 2017, 8 pages.

* cited by examiner

*Primary Examiner* — Jason S Daniels
(74) *Attorney, Agent, or Firm* — Adler Pollock & Sheehan P.C

(57) ABSTRACT

A vehicle seat has a frame, a padded seat back assembly (16), a padded seat cushion assembly (18), and a seat cushion assembly tilt arrangement for tilting the seat cushion assembly. A valance cover (34) is mounted on an outer side of the seat. The cover has a rearward cover section (34a) and a forward cover section (34b). The forward cover section (34b) is mounted in fixed relation to the seat cushion assembly (18) for tilting movement together with the seat cushion assembly. The seat cushion padding (24) extends over an upper surface of the forward cover section (34b).

14 Claims, 4 Drawing Sheets

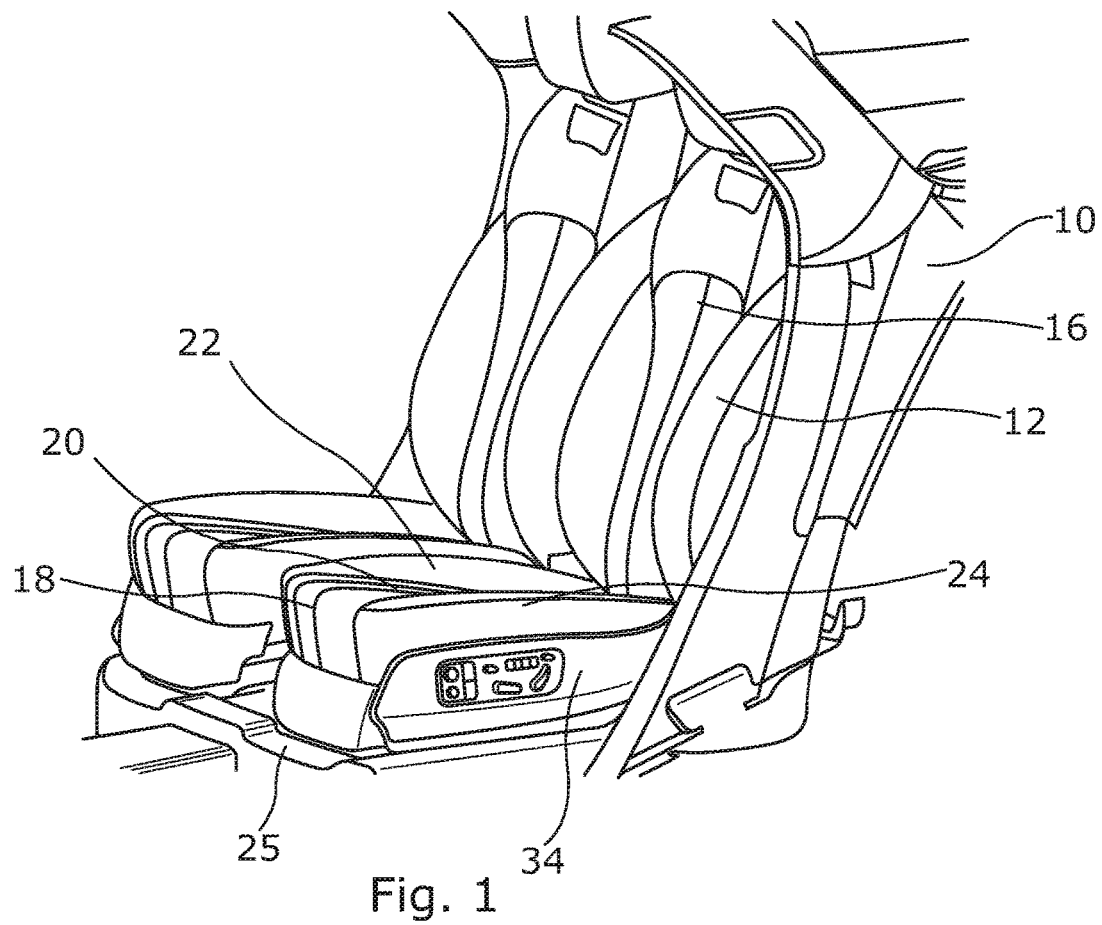
Fig. 1
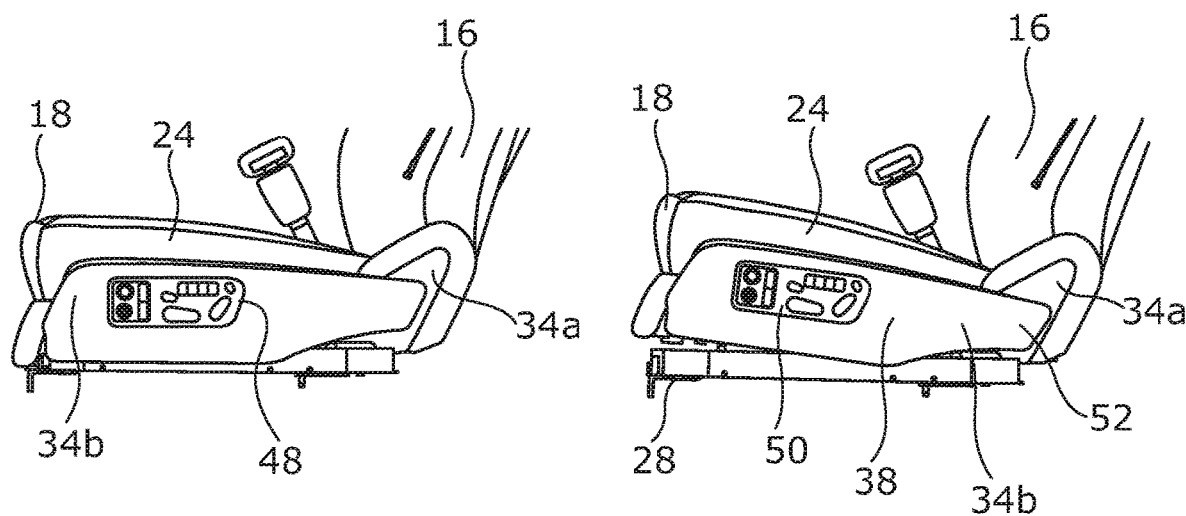
Fig. 2
Fig. 3

VEHICLE SEAT

CROSS REFERENCE TO RELATED APPLICATIONS

This application is a national phase filing under 35 U.S.C. § 371 of International Application No. PCT/GB2016/053639 filed Nov. 23, 2016, which claims priority from United Kingdom application number GB1521198.0, filed Dec. 1, 2015, the entire contents of which are hereby incorporated by reference herein.

TECHNICAL FIELD OF THE INVENTION

The present invention relates to a vehicle seat and in particular an automobile seat. The invention also relates to a vehicle having a vehicle seat.

BACKGROUND TO THE INVENTION

Automobile seats generally comprise a main structure or frame, a padded seat back assembly and a padded seat cushion assembly. Mounted to the frame are a pair of upper track members that slidably engage with lower track members attached to the floor of the automobile to fix the seat in the automobile whilst allowing the position of the seat to be adjusted in forward and rearward directions. The seat back assembly is usually pivotally mounted relative to the frame so that its angle of inclination can be adjusted in forward and rearward directions. It is also known to provide a seat cushion tilt arrangement to allow the seat cushion assembly to be selectively tilted forwardly or backwardly to adjust its pitch relative the frame independently of the seat back.

A valance cover is often provided along the outer side of an automobile seat adjacent the vehicle door to house various parts of the seat structure, such as the reclining mechanism for the seat back, as well as adjustment controls for the seat. The cover is typically a rigid moulded housing made from polymeric materials which protects the enclosed components of the seat from user damage and vice versa and also provides a neat finish. The known covers extend adjacent a side of the seat cushion assembly and a lower side region of the seat back assembly. The known covers are fixed relative to the main seat structure so that they move with the seat as a whole as it is adjusted forwardly or backwardly along the tracks but do not move with the seat cushion as it tilts or the seat back as its angle of inclination is adjusted.

The known covers are usually mounted outside the padded area of the seat cushion assembly so that a user has to climb over the cover when entering or leaving the vehicle. This can be a problem, especially when the seat is mounted adjacent a rear door of an automobile which may provide more restricted access than a front door. The presence of the cover also limits the width of the padded seating area provided by the seat cushion assembly. Again this is a particular concern where a seat is located in the rear of the vehicle where the width of the vehicle may be more restricted than in the front. These are particular concerns for the luxury car market where a premium is placed on passenger comfort.

There is a need then for a vehicle seat which overcomes, or at least mitigates, the problems of the known vehicle seats.

SUMMARY OF THE INVENTION

Aspects of the invention relate to a vehicle seat and to a vehicle.

According to a first aspect of the invention, there is provided a vehicle seat comprising a frame, a padded seat back assembly, a padded seat cushion assembly, a seat cushion assembly tilt arrangement for tilting the seat cushion assembly relative to the frame, and a cover on one side of the seat; wherein the cover comprises a rearward cover section and a forward cover section, the forward cover section being mounted in fixed relation to the seat cushion assembly for movement together with the seat cushion assembly when it is tilted, the seat cushion padding extending over an upper surface of the forward cover section.

The rearward cover section may be mounted in fixed relation to the main seat structure/frame.

The forward cover section may comprise a cover support member and an outer cover member releasably mountable to the cover support member. The cover support member may be mounted to said seat cushion assembly. The cover support member may also be supported on the seat frame by means of a sliding bearing. The sliding bearing may include a bush fixed to the seat frame, the bush being slidably received in an elongate slot defined in the support member.

The rearward cover section may also comprises a support member mounted to the seat frame and an outer cover member releasably mountable to the rearward cover support member.

The support members and the cover members may be moulded from polymeric materials.

The seat cushion assembly may comprise a central seating area with raised bolster regions along either side, one of said bolster regions extending over and being supported on the upper surface of the forward cover section.

In an embodiment, the seat further comprises an upper track member mounted to the frame for engagement with a lower track member mounted to a vehicle floor, the seat including a track cover for covering at least the upper track member, the forward cover section having a lower profile which overlaps the track cover.

In an alternative embodiment, the seat further comprises an upper track member mounted to the frame for engagement with a lower track member mounted to a vehicle floor, the seat including a track cover for covering at least the upper track member, the track cover having an upwardly directed projection which overlaps with a lower edge profile of the forward cover section.

The seat may be an automobile seat.

In accordance with a second aspect of the invention, there is provided a vehicle comprising a seat in accordance with the first aspect of the invention. The vehicle may be an automobile. The seat may be a rear seat of the vehicle.

DETAILED DESCRIPTION OF THE INVENTION

In order that the invention may be more clearly understood an embodiment thereof will now be described, by way of example only, with reference to the accompanying drawings, of which:

FIG. 1 is a perspective view of a rear section of an automobile in which a seat in accordance with an aspect of the invention is mounted, the seat being visible through an open doorway with the door and part of a door pillar omitted for clarity.

FIGS. 2 and 3 are side views of a lower region of the seat of FIG. 1 showing the seat with a seat cushion assembly in non-tilted and tilted configurations respectively;

Figure 4:
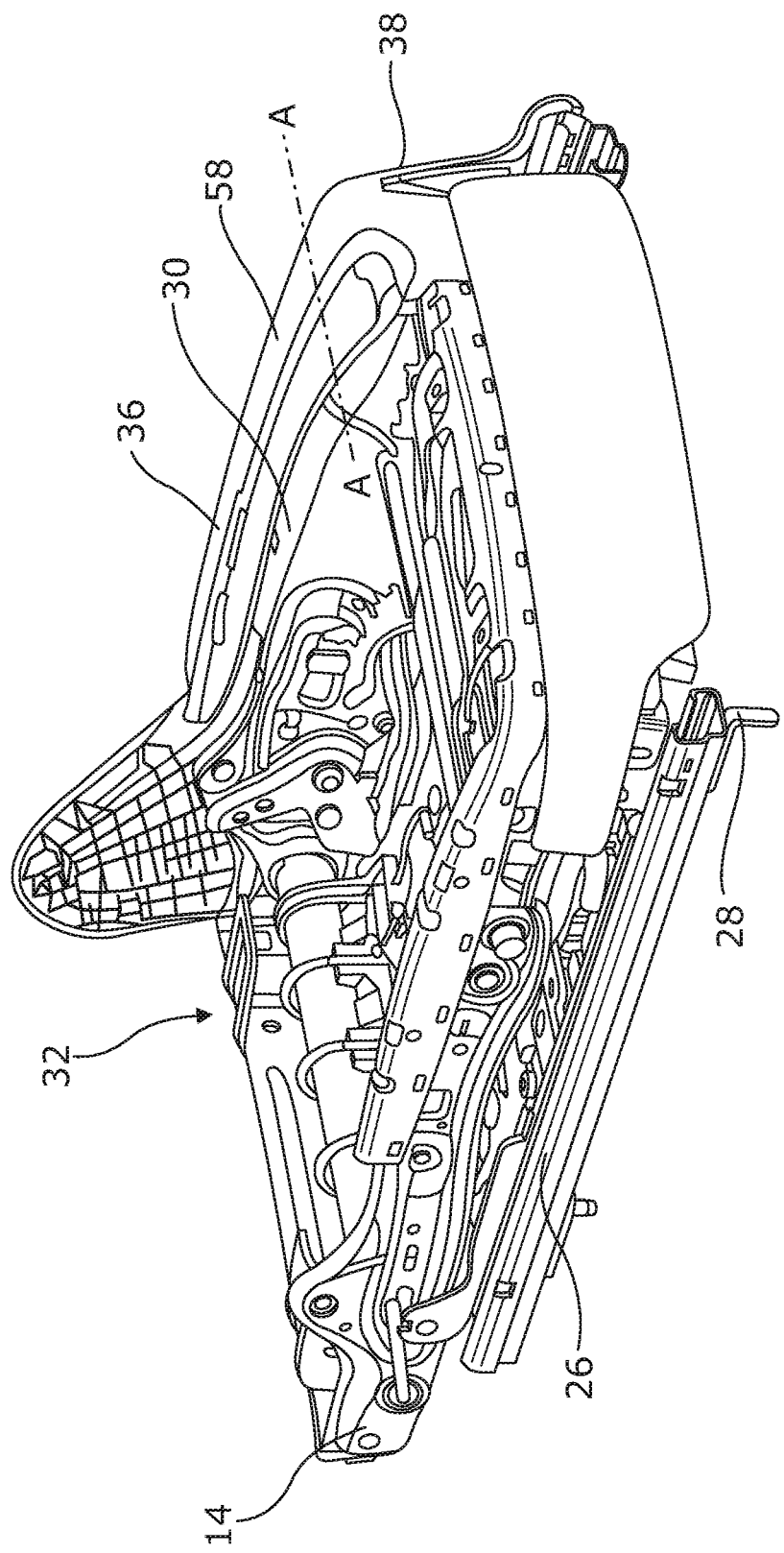
FIG. 4 is a perspective view of the interior structure of a lower part of a vehicle seat in accordance with an aspect of the invention.
Figure 6:
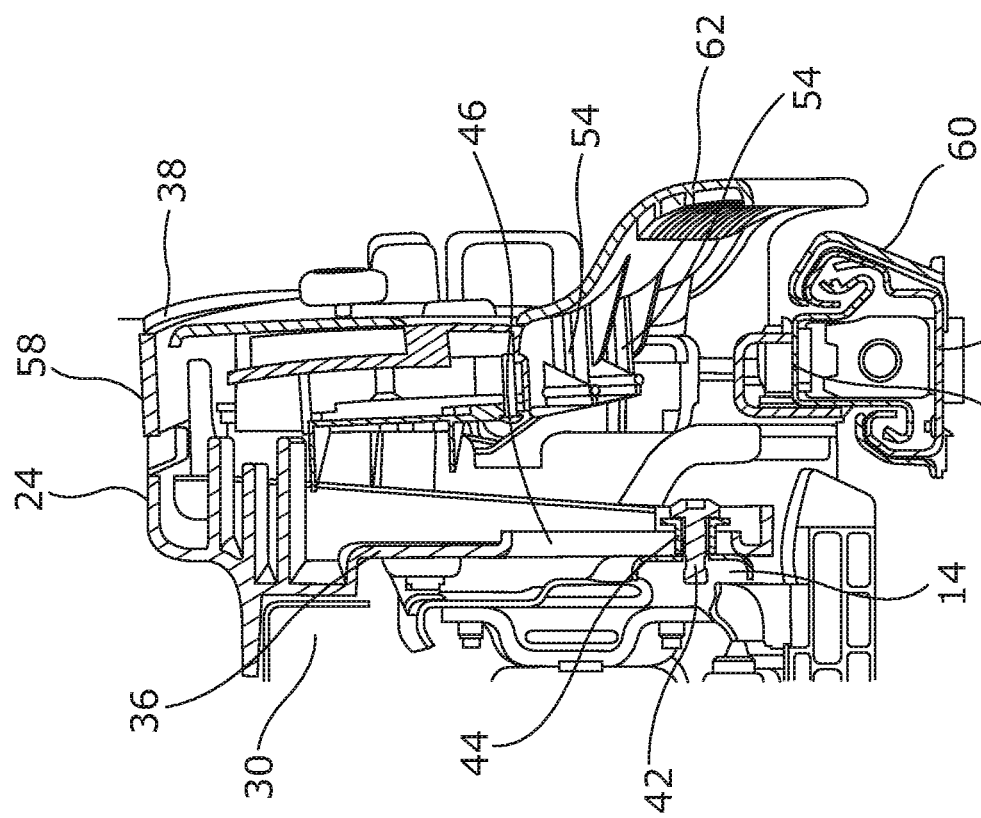
Figure 5:
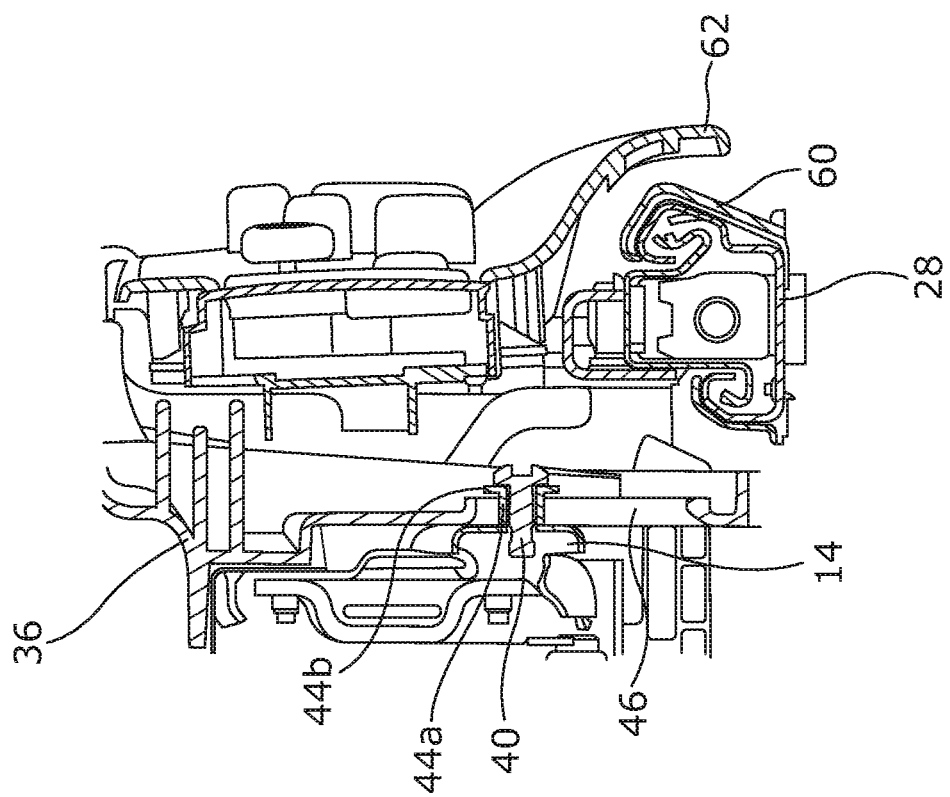
Figure 7:
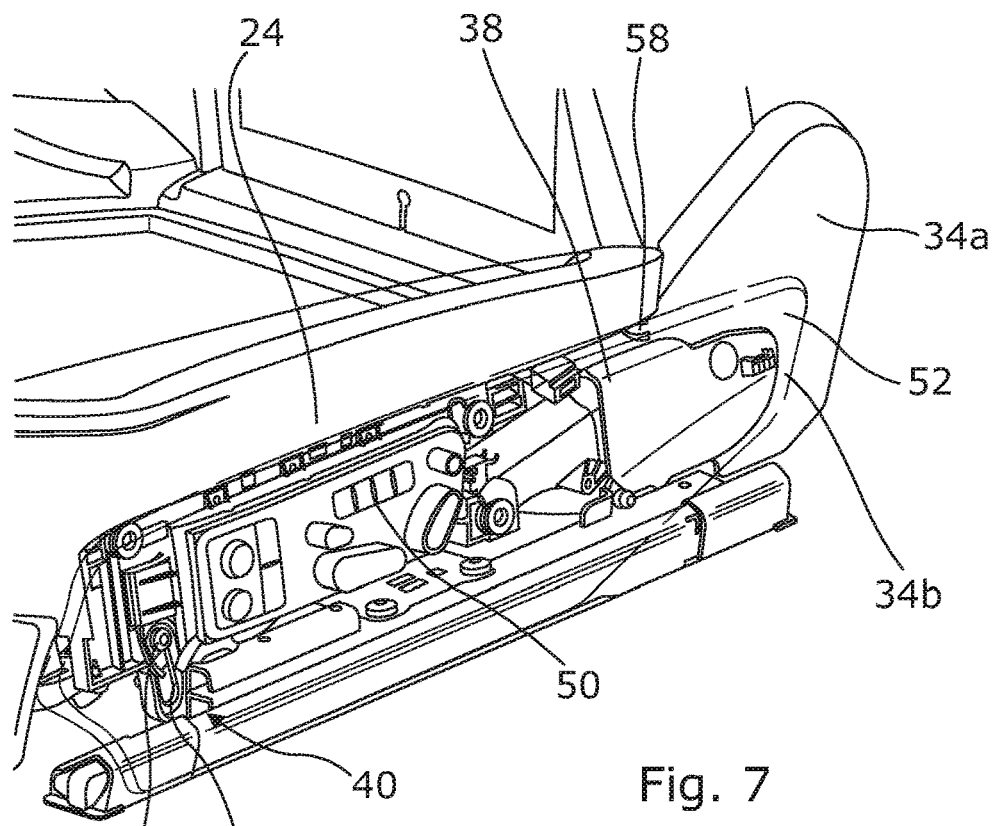
Figure 8:
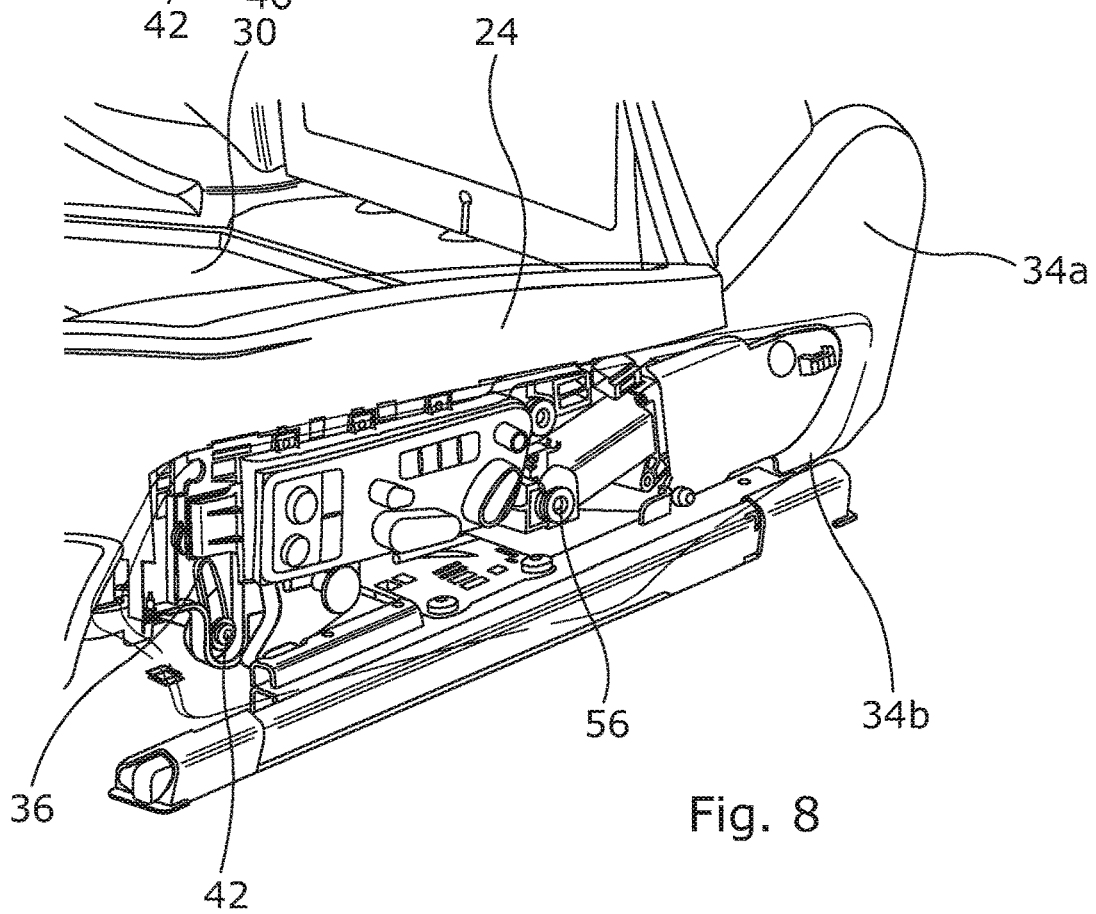

FIGS. 5 and 6 are cross-sectional views through part of the structure of FIG. 4 taken along line A-A showing the structure with a seat pan forming part of the seat cushion assembly in non-tilted and tilted configurations respectively; and FIGS. 7 and 8 are perspective views taken from the front and to one side of the seat of FIGS. 1 to 3, with some of the features ghosted to show the internal constructional details and showing the seat with a seat cushion assembly in non-tilted and tilted configurations respectively.

An embodiment of a vehicle seat in accordance with an aspect of the invention is illustrated in the accompanying drawings.

FIG. 1 illustrates part of the body structure of an automobile 10 having a seat 12 in accordance with the invention mounted in a rear passenger compartment. FIG. 1 shows only part of the body structure of the automobile. The seat 12 has a main structure or frame 14 (shown in FIG. 4) to which are mounted a seat back assembly 16 and a seat cushion assembly 18. Both the seat cushion assembly and the seat back assembly are padded and upholstered, with the seat cushion assembly having a padded central seating area 20 and raised padded bolster regions 22, 24 along either side.

The seat 12 is mounted to the floor 25 of the automobile by means of tracks which allow for forward and rearward adjustment of the seat position in the vehicle. As illustrated in FIG. 4, upper track members 26 are attached to the seat frame 14 on either side. The upper track members 26 slidably engage with lower track members 28 which are fixed in position to the floor of the automobile. The longitudinal position of the upper track members 26 on the lower track 28 members can be selectively adjusted in a conventional manner.

The seat cushion assembly 18 includes a seat cushion pan 30 on which the seat cushion padding is mounted. The seat cushion pan 30 is pivotally mounted to the seat frame 14 so that it can be tilted relative to the frame in a forward and reward direction. The seat 12 includes seat cushion tilt arrangement (indicated generally at 32) for tilting the seat cushion pan 30 in a forward and rearward direction to adjust the pitch of the seat cushion assembly 18. The actual mechanism 32 by which the seat cushion pan 30 is tilted is not relevant to the present invention and so will not be described in further detail.

The seat back 12 is pivotally mounted with respect to seat frame 14 towards the rear end of the seat cushion pan 30 so that its angle of inclination can be selectively adjusted in a forward/rearward direction by means of a reclining device (not shown) in a known manner.

The seat has a valance cover 34 mounted on its outer side. The cover 34 is in two sections, a rearward section 34a and a forward section 34b.

The rearward cover section 34a is mounted adjacent a lower end region of the seat back 16 and a rear side edge region of the seat cushion assembly 18. The rearward cover section 34a encases part of the reclining device for the seat back 16 and is fixed relative to the seat frame 14 so that it remains stationary when the seat back 16 is reclined and/or the seat cushion assembly 18 is tilted.

The forward cover section 34b extends along the side of the seat cushion assembly 18 from the rearward cover sections 34a towards a front end of the seat cushion assembly. The forward cover section 34b encases parts of the seat structure, which may include parts of the seat cushion pan 30 and the tilting arrangement 32, and the upper track member 26.

The forward cover section 34b includes a forward cover support member 36 and a forward outer cover member 38. The forward cover support member 36 is a moulded component which is mounted in fixed relation along an upper side of the seat cushion pan 30 so as to move with the seat cushion pan 30 when the seat cushion assembly 18 is tilted. The forward cover support member 36 is also connected with the seat frame 14 by means of a sliding bearing assembly 40. This provides greater support and stability for the valance cover 34. The bearing assembly 40 includes pin 42 fixedly mounted to the frame 14 and a bush 44 mounted to the pin 42. The bush 44 has a circular body 44a which is a close sliding fit in an elongate slot 46 defined in the forward cover support member 36 and has a radially outwardly projecting flange 44b which overlies the support member 36 on either side of the slot. As illustrated in FIGS. 5 to 8, the bush 44 is able to slide relative to the support member 36 within the slot 48 as the seat cushion assembly is tilted. The bush 44 may be made of a polymeric or composite material.

The outer cover member 38 is in the form of a shaped panel which is releasably attachable to the support member 36 to form an attractive decorative finish to the cover 34. In the present embodiment, the outer cover member 38 defines a recess or aperture 48 which allows access to a control panel 50 having a number of control switches for adjusting the seat and other functions. A rear end region 52 of the outer cover member overlies part of the rearward cover section 34a. The rear end region is spaced from the rearward cover section 34a and is able to move relative to the rearward cover section as the seat cushion assembly 18 tilts.

Any suitable means for mounting the outer cover member 38 to the support member 36 can be used but it is preferred that the outer cover member 38 is releasably mounted to the cover support member 36 to allow for removal for maintenance purposes. In the present embodiment, the outer cover member 38 is releasably secured to the cover support member 36 by means of resilient clips 54 on the outer cover member 38 which engage in corresponding apertures 56 in the support member 38. The cover support member 36 and the outer cover member 38 are generally rigid moulded components formed from polymeric materials, though the outer cover member may have a degree of flexibility. However, they can be formed from any suitable materials using any suitable methods. The apertures 56 may be formed directly in the support member 36 or they may be provided by means of separate inserts which are attached to the support member.

The rearward cover section 34a may also comprise a support member affixed to the seat frame 14 and an outer cover member which is releasably attachable to the supporting member in a similar manner to the forward cover section 34b.

As illustrated in FIGS. 2 and 3, the forward cover section 34b is constrained to move with the seat cushion pan 30 as it tilts relative to the main seat structure and so moves in an arc relative to the rearward cover section 34a when the seat cushion assembly 18 is tilted.

As can be seen best in FIG. 1, part of the seat cushion padding extends over an upper surface 58 of the forward cover section 34b. The upper surface 58 may be defined by the cover support member 36 and/or the forward outer cover member 38. In particular, the bolster region 24 on the outside of the seat cushion assembly 18 is located above and is supported by the upper surface 58 of the forward cover section 34b. This is made possible because the forward cover section 34b moves with the seat cushion assembly 18 as it tilts so that it supports the bolster region 24 of the seat cushion padding at all times, even when the seat cushion assembly 18 is tilted rearwardly so that the front end is raised as shown in FIG. 3.

Positioning the bolster region 24 of the seat cushion assembly padding above and supporting it on the forward cover section 34b has several advantages. When a user is entering or leaving the vehicle they will move over the padded bolster region 24 rather than an exposed surface of the hard cover 34. This makes it easier for a user to enter and/or leave the vehicle comfortably. Positioning the bolster region 24 above the forward cover section 34b also increases the effective width of the seating region provided by the seat cushion assembly 18 allowing for increased levels of comfort for a given width of vehicle.

The seat 12 also includes a track cover 60, which covers at least the upper track member 26 on the outside of the seat in combination with a lower profile 62 of the forward cover section 34b. As the forward cover section 34b, moves with the seat cushion assembly 18 when it tilts, the track cover 60 and/or the lower profile 62 of the forward cover section 34b may be adapted to ensure that no or only a minimal gap is left when the seat cushion assembly 18 is tilted up at the front, as shown in FIG. 3. This might include overlapping the lower profile 62 of the forward cover section 34b and the track cover 60. Alternatively, the track cover 60 could be provided with an elongate upstand like a shark fin to close any gap or a combination of these two concepts could be adopted.

The above embodiment is described by way of example only. Many variations are possible without departing from the scope of the invention as defined in the appended claims.

The invention claimed is:

1. A vehicle seat comprising a frame, a padded seat back assembly, a padded seat cushion assembly, a seat cushion assembly tilt arrangement for tilting the seat cushion assembly relative to the frame, and a cover on one side of the seat; wherein the cover comprises a rearward cover section and a forward cover section, the forward cover section being mounted in fixed relation to the seat cushion assembly for movement together with the seat cushion assembly when it is tilted, seat cushion padding extending over an upper surface of the forward cover section.

2. A vehicle seat according to claim 1, wherein the rearward cover section is mounted in fixed relation to the frame.

3. A vehicle seat according to claim 1, wherein the forward cover section comprises a cover support member and an outer cover member releasably mountable to the cover support member.

4. A vehicle seat according to claim 3, wherein the cover support member is mounted to said seat cushion assembly.

5. A vehicle seat according to claim 4, wherein the cover support member is supported on the seat frame by means of a sliding bearing.

6. A vehicle seat according to claim 5, wherein the sliding bearing includes a bush fixed to the seat frame, the bush being slidably received in an elongate slot defined in the support member.

7. A vehicle seat according to claim 4, wherein the seat cushion assembly comprises a seat cushion pan pivotably connected to the frame, the cover support member being fixedly mounted to the seat cushion pan for movement therewith.

8. A vehicle seat according to claim 1, wherein the seat cushion assembly comprises a central seating area with raised bolster regions along either side, one of said bolster regions extending over and being supported on the upper surface of the forward cover section.

9. A vehicle seat according to claim 1, wherein the seat further comprises an upper track member mounted to the frame for engagement with a lower track member mounted to a vehicle floor, the seat including a track cover for covering at least the upper track member, the forward cover section having a lower profile which overlaps the track cover.

10. A vehicle seat according to claim 1, wherein the seat further comprises an upper track member mounted to the frame for engagement with a lower track member mounted to a vehicle floor, the seat including a track cover for covering at least the upper track member, the track cover having an upwardly directed projection which overlaps with a lower edge profile of the forward cover section.

11. A vehicle seat according to claim 1, wherein the vehicle is an automobile.

12. A vehicle comprising the seat according to claim 1.

13. A vehicle according to claim 12, wherein the vehicle is an automobile.

14. A vehicle according to claim 12, wherein the seat is a rear seat of the vehicle.

* * * * *